S. HARRIS.
Harrow.

No. 218,173. Patented Aug. 5, 1879.

Witnesses
Frank A. Brooks
S. H. Towne

Inventor
Silas Harris
By Dewey & Co.

UNITED STATES PATENT OFFICE.

SILAS HARRIS, OF SAN FRANCISCO, CALIFORNIA.

IMPROVEMENT IN HARROWS.

Specification forming part of Letters Patent No. 218,173, dated August 5, 1879; application filed June 16, 1879.

*To all whom it may concern:*

Be it known that I, SILAS HARRIS, of the city and county of San Francisco, and State of California, have invented an Improved Harrow; and I hereby declare the following to be a full, clear, and exact description thereof.

My invention relates to an improvement in harrows; and my improvements consist in making the bars carrying the teeth of what is commonly known as "channel-iron," and providing a peculiarly-made spring-clamp between the flanges of the iron, which holds the teeth firmly in place.

It further consists in providing wheels for the harrow, which are made in such a way as to dispense with an axle, and be attached to the fixed teeth at the corners, so that the harrow may be moved to or from the field, while at the same time the wheels can be removed and placed on the upper end of the teeth in a reverse position when the harrow is in use, being thus utilized as weights.

It also consists in providing a removable seat, which is fitted on the upper end of any of the teeth, and upon which the driver may sit as the implement is drawn over the field.

Figure 1:
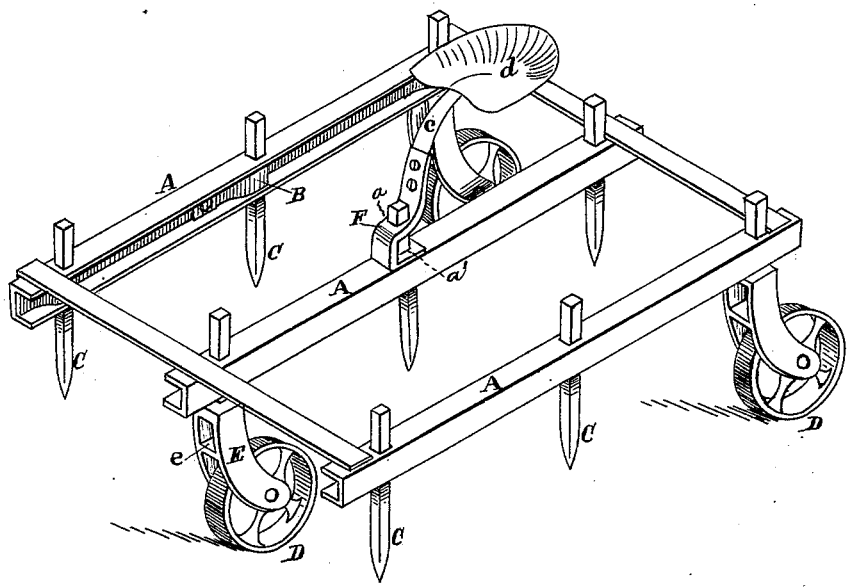
Figure 2:
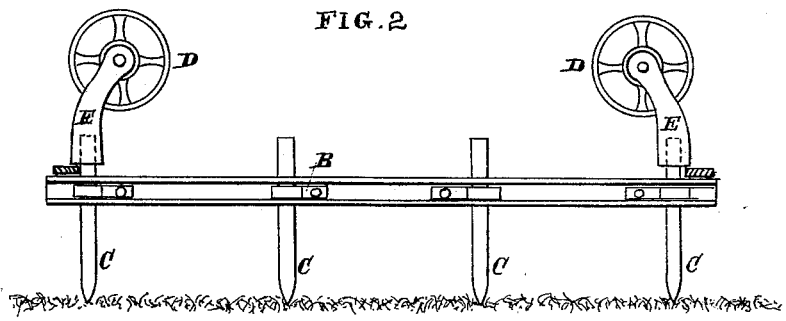
Figure 3:
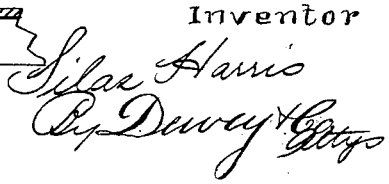

Referring to the accompanying drawings, Figure 1 is a perspective view of my invention. Fig. 2 is a side view with the wheels reversed. Fig. 3 shows the spring-clamp.

Let A represent the bars in which the teeth are placed. These bars composing the frames are formed of what is ordinarily termed "channel-iron," and are set so that the teeth drive through the flanges of the iron, as shown. On the vertical portion or bottom of the channel is a spring-clamp, B, made curved, as shown, its lower or flat end being secured to the vertical portions by means of a rivet, $b$. The teeth C are driven in from above, and pass down through corresponding holes in the two flanges of the iron. As the metal clamp B is placed between these holes, as the tooth is driven down it passes between the clamp, which, from its peculiar shape, grasps the tooth from the outside and holds it firmly. The tooth has a firm wide bearing, although the frame is light, the clamp being pushed out as the tooth goes in, and the spring which occurs from its peculiar shape pressing it back on the tooth C.

The wheels D revolve on a pin in the stock E. This stock has a hole through its upper end, and the bar $e$ across it has also a hole through it in line with the upper hole. By inserting the tooth of the harrow through the holes in the stock the wheel is held in place, but will revolve not only on its spindle, but around the tooth in a horizontal axis, after the manner of a caster-wheel. When it is desired to remove the wheels the harrow is lifted and they drop off the teeth. They can then be placed on top of the harrow-teeth in a reverse position, and answer as a weight for the harrow. One wheel may be placed on each corner, or two behind and one in front. The harrow then can be moved about like any wheeled implement; but as soon as it is desired to use it, the wheels may be taken off and the stocks slipped over the upper ends of the teeth upside down, where they will remain until required, answering as weights.

A peculiar curved bar or rod, F, has holes $a\ a'$ formed in it, as shown, and at its upper end is a spring-bar, $c$, on which is a seat, $d$. By inserting the upper end of a tooth in the holes $a\ a'$ the seat is supported in a proper position, the bar $c$ answering as a spring.

The driver can then ride comfortably, while the seat is not in the way, and requires no supplementary fixture on the harrow to secure it in position. By lifting it up off the harrow-tooth it may be removed at any time, if desired.

By making the wheels and seat removable in this simple manner the harrow may be taken to the field like any ordinary wheeled implement or wagon. When there, the wheels and seat may be removed, if desired, altogether, or left on top of the harrow for weights. No axles are required for the wheels, as they revolve on their stocks, which in turn revolve on their teeth.

Having thus described my invention, what I claim as new, and desire to secure by Letters Patent, is—

1. The harrow-frame composed of the channel-iron bar A, provided with a spring-clamp, B, in combination with the teeth C, whereby the frame is made light and strong, and a broad bearing given at the same time to the teeth, substantially as herein described.

2. In combination with the harrow-teeth C, the wheels D, with their stocks E, and steadying-bar e and holes, whereby said wheels may be placed on the teeth to support the harrow, or removed and placed on top of the teeth to add weight to the harrow, substantially as herein described.

3. In combination with a harrow-tooth, C, the seat-supporting bar or rod F, with its tooth-inclosing holes $a$ $a'$, spring-bar $c$, and seat $d$, said bar being fitted to rest on and be held by the fixed harrow-tooth, substantially as and for the purpose herein described.

In witness whereof I have hereunto set my hand.

SILAS HARRIS.

Witnesses:
 CHAS. G. YALE,
 S. H. NOURSE.